(12) United States Patent
Lee et al.

(10) Patent No.: US 7,724,809 B2
(45) Date of Patent: May 25, 2010

(54) JOINT DETECTION-DECODING RECEIVER OF DS-CDMA SYSTEM

(75) Inventors: Jang-Yeon Lee, Sungnam (KR); Hyung-Keun Lee, Seoul (KR); Jin-Woong Cho, Yongin (KR); Hyeon-Seok Lee, Seoul (KR); Yun-Jae Won, Yongin (KR)

(73) Assignee: Korea Electronics Technology Institute, Kyunggi-Do (KR)

( * ) Notice: Subject to any disclaimer, the term of this patent is extended or adjusted under 35 U.S.C. 154(b) by 695 days.

(21) Appl. No.: 11/614,318

(22) Filed: Dec. 21, 2006

(65) Prior Publication Data
US 2008/0123719 A1 May 29, 2008

(30) Foreign Application Priority Data
Nov. 27, 2006 (KR) .................... 10-2006-0117360

(51) Int. Cl.
*H04B 1/00* (2006.01)
(52) U.S. Cl. .................................................. 375/152

(58) Field of Classification Search ............... 375/143, 375/144, 148, 152, 340, 341, 343
See application file for complete search history.

(56) References Cited

U.S. PATENT DOCUMENTS

| 6,898,248 | B1 * | 5/2005 | Elgamal et al. | 375/259 |
|---|---|---|---|---|
| 2004/0081074 | A1 * | 4/2004 | Piechocki | 370/206 |
| 2004/0090906 | A1 * | 5/2004 | Moshavi et al. | 370/208 |
| 2004/0190603 | A1 * | 9/2004 | Dabak et al. | 375/148 |

* cited by examiner

*Primary Examiner*—Don N Vo
(74) *Attorney, Agent, or Firm*—Edell, Shapiro & Finnan, LLC

(57) ABSTRACT

A joint detection-decoding receiver using a multistage parallel interference canceller for selectively estimating a partial codeword corresponding to a state transition (branch) is disclosed. The JDD receiver of the DS-CDMA system includes a PIC that employs a state sequence to selectively carry out a symbol estimation of a partial codeword corresponding to the branch so as to reduce complexity and a calculation load as well as maintaining a high performance of the receiver according to the joint detection-decoding.

5 Claims, 12 Drawing Sheets

JOINT DETECTION-DECODING RECEIVER OF DS-CDMA SYSTEM

RELATED APPLICATIONS

The present disclosure relates to subject matter contained in priority Korean Application No. 10-2006-0117360, filed on 27 Nov. 2006 which is herein expressly incorporated by reference in its entirety.

BACKGROUND OF THE INVENTION

The present invention relates to a joint detection-decoding receiver, and in particular, to a joint detection-decoding receiver using a multistage parallel interference canceller for selectively estimating a partial codeword corresponding to a state transition (branch).

A DS-CDMA (Direct Sequence Code Division Multiple Access) is widely used as a multiple access scheme used in a wireless channel shared by multiple users. In accordance with a DS-CDMA system, different signature sequences or pseudo-noise (PN) codes are assigned to the multiple users. A DS-CDMA receiver comprises a bank of matched filters in order to obtain a user data from a received signal.

However, the DS-CDMA system has a disadvantage of a performance degradation due to a MAI (multiple Access Interference) by other user signals. In order to overcome the disadvantage, a method for removing the MAI through a MUD (Multi-User Detection) has been proposed. The MUD may reduce an effect of the MAI as well as improving a system capacity and a service quality. Considering an uplink of the DS-CDMA system, the receiver of a base station has an information on a spreading sequence of every user. Therefore, the receiver may remove the MAI using the information.

A JDD (Joint Detection-Decoding) receiver is proposed as a novel method for detecting the multi-user. The JDD receiver utilizes an information on a channel code to simultaneously carry out the MUD and a channel decoding.

FIG. 1 is a block diagram illustrating a multi-user detection tranceiving system of a DS-CDMA system.

Referring to FIG. 1, in accordance with the DS-CDMA system, a sequence of information bits $b_k$ of a user k is encoded into a sequence of channel symbols $d_k$, and the sequence of channel symbols $d_k$ is transmitted via a multi-user channel. The sequence of channel symbols $d_k$ is received at a receiver as an output $y_k$ of a matched filter bank 30 through the matched filter bank 30. The output $y_k$ not only includes the MAI due to other users but also has a correlation over a frame of the channel code. Therefore, a multi-user detector 40 detects a symbol estimate $\hat{d}_k$ for the other users from the output $y_k$ of the matched filter bank, and a channel decoder 50 calculates an information estimate $\hat{b}_k$ of the sequence of information bits $b_k$ through a decoding. An accuracy of the symbol estimation according to a channel encoding is improved and an effect of the MAI is reduced by the joint detection-decoding. However, it is disadvantageous that a complexity of the JDD receiver is linearly increased proportional to a number of repetitions and compensations of the MUD and a frame size of the channel code.

A PIC (Parallel Interference Canceller) is generally used in the DS-CDMA system in order to effectively remove the MAI. The PIC predicts the symbol for entire users simultaneously in parallel. A PIC receiver including attempts to remove the MAI through a signal processing of each stage for the entire users. The PIC receiver has a much simpler structure compared to a general linear MUD receiver.

FIG. 2 is a block diagram illustrating a parallel interference canceller of a DS-CDMA system.

As shown, each stage of the PIC comprises estimators 101 and 201, and cancellers 102 and 202. The estimators 101 and 201 estimates the symbols for the entire users and the MAI for the entire users is removed based on the estimation. A first stage of the PIC employs a bank of a single-user matched filter. An accuracy of the prediction increases according to a number of the stages, and a performance of the PIC is also improved.

For the user k, when a current parallel interference cancellation stage is assumed to be l, the estimators 101 and 201 computes a symbol estimate $\hat{d}_k(l|l-1)$ from the a posteriori signal $y_k(l-1)$ of the previous stage. The symbol estimate $\hat{d}_k(l|l-1)$ is treated as a priori information for a cancellation next stage. The cancellers 102 and 202 removes the MAI included in a user signal $y_k(l)$ using a correlation matrix R.

$$y_k(l) = y_k(0) - \sum_{i \neq k} \rho_{ik} \hat{d}_i(l|l-1) \qquad \text{[Equation 1]}$$

A final decision is established based on the signal $y_k(l)$ of a last stage. However, the estimators 101 and 201 of the conventional PIC carries out a hard-decision of the symbol estimate $\hat{d}_k(l|l-1)$ through the posteriori signal $y_k(l-1)$. When the estimators 101 and 201 make an improper decision, the interference removal becomes inaccurate, thereby reducing the accuracy of the interference removal is drastically reduced passing through each stage. Therefore, an accurate symbol estimation of the estimators 101 and 201 is very important, and the JDD receiver improves the accuracy by using the channel code at the symbol estimation stage.

In accordance with the conventional JDD receiver, when a convolution code (n, m, l) having a code rate of m/n and a memory length of l is used as the channel code, an information sequence $b_k = [b_k^{(1)}, \ldots, b_k^{(N)}] = [b_k^{(1)}, \ldots, b_k^{(mN)}]$ having a length of mN of a k-th user is encoded into a code word $d_k = [d_k^{(1)}, \ldots, d_k^{(N+l)}] = [d_k^{(1)}, \ldots, d_k^{(n(N+l))}]$ having a length of n(N+1), where N is a frame size of a channel code.

Since the codeword is transmitted through a multi-user channel and an error correction is possible by a redundant portion of the channel code, the JDD receiver improves the accuracy of the estimation stage. However, the entire codeword should be processed in the estimators 101 and 201 of each stage and the cancellers 102 and 202, the JDD receiver is disadvantageous in that the complexity and a computation load of the receiver are increased.

SUMMARY OF THE INVENTION

It is an object of the present invention to provide a JDD receiver of a DS-CDMA system wherein a PIC employs a state sequence to selectively carry out a symbol estimation of a partial codeword corresponding to a branch so as to effectively reduce complexity and a calculation load compared to the conventional JDD receiver wherein the symbol estimation is carried out for an entire codeword as well as maintaining a high performance of the receiver according to a joint detection-decoding.

In order to achieve the above-described object, there is provided a joint detection-decoding receiver of a DS-CDMA system, the receiver comprising: a matched filter for dividing a plurality of channel coded symbols of a plurality of users according to each of the plurality of users to generate a matched filter output; and a multistage parallel interference canceller for repeatedly carrying out a symbol estimation for each of the plurality of users using the matched filter output and a symbol removal of other users using a correlation matrix to reduce a multiple access interference, wherein the multistage parallel interference canceller estimates a partial code word corresponding to a branch as a symbol estimation using a state sequence.

DETAILED DESCRIPTION OF THE INVENTION

The above-described objects and other objects and characteristics and advantages of the present invention will now be described in detail with reference to the accompanied drawings.

Figure 3:
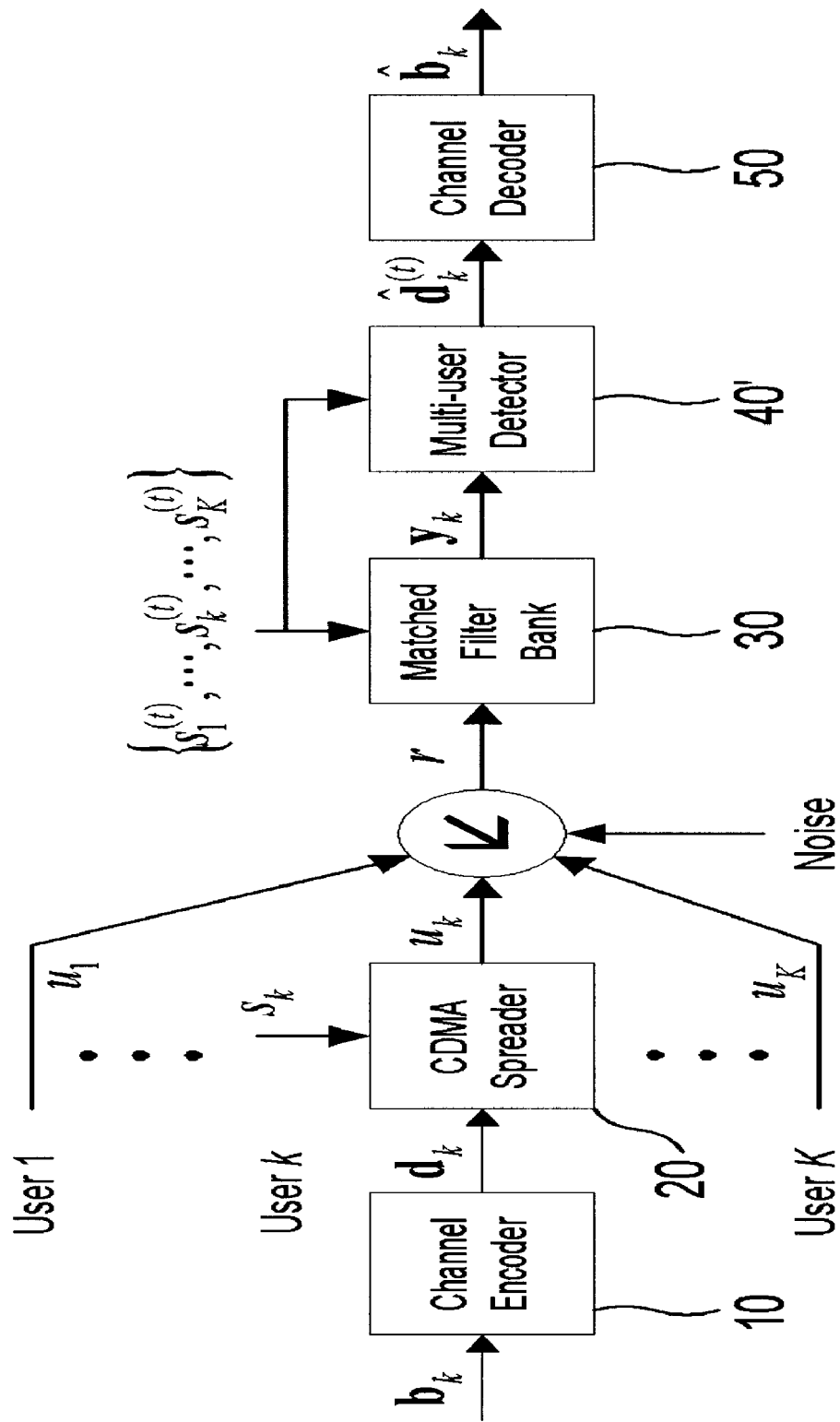
FIG. 3 is a block diagram illustrating a multi-user detection tranceiving system of a DS-CDMA system in accordance with the present invention.

FIG. 3 is a block diagram illustrating a multi-user detection tranceiving system of a DS-CDMA system in accordance with the present invention.

Referring to FIG. 3, a sequence of information bits $b_k$ of a user k is encoded into a sequence of channel symbols $d_k$, and the sequence of channel symbols $d_k$ is transmitted via a multi-user channel. The transmitted sequence is received by the receiver of the present invention.

Figure 1:
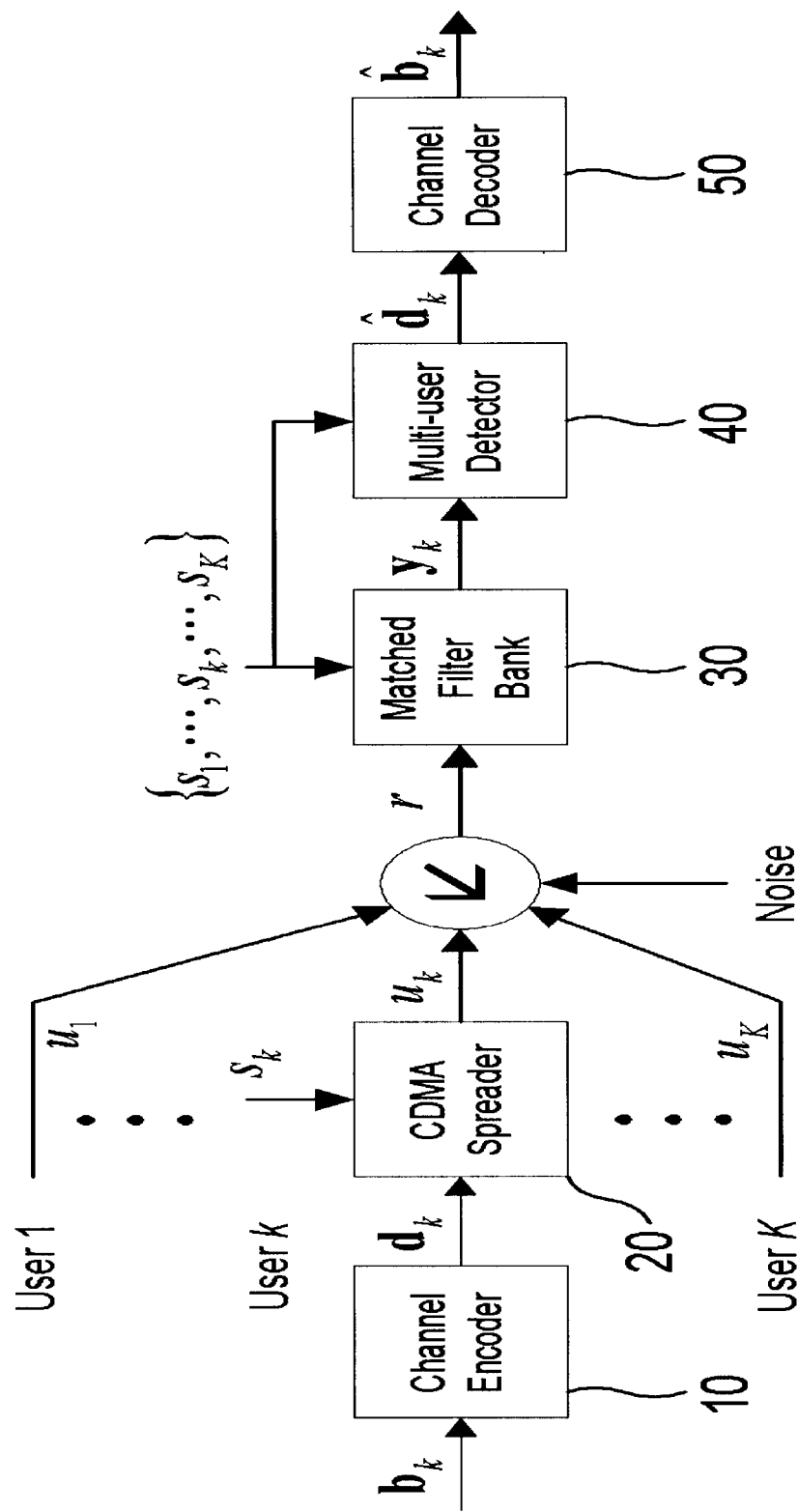
FIG. 1 is a block diagram illustrating a conventional multi-user detection tranceiving system of a DS-CDMA system.
Figure 2:
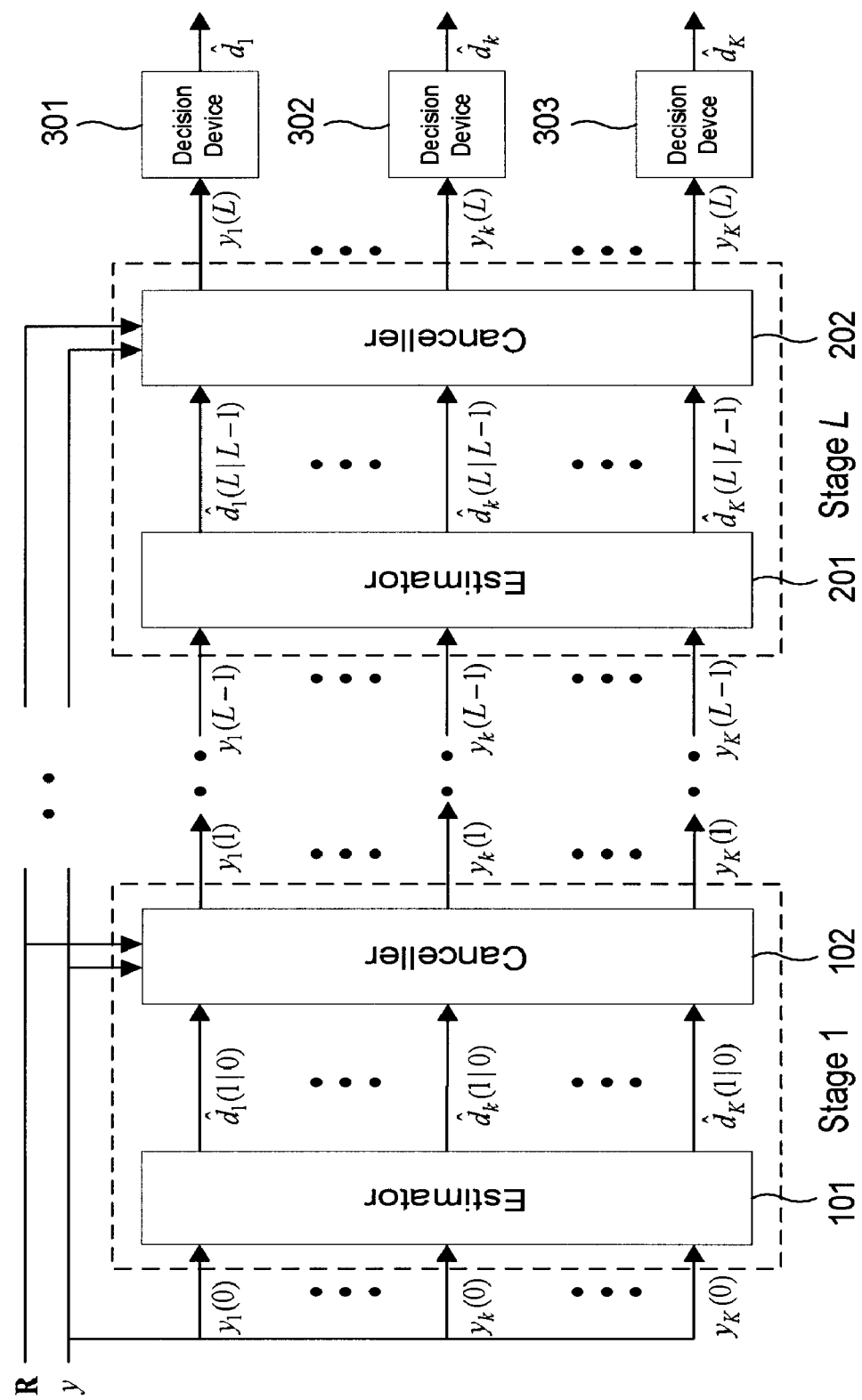
FIG. 2 is a block diagram illustrating a conventional parallel interference canceller of a DS-CDMA system.

The JDD receiver in accordance with the present invention comprises a matched filter bank 30, a multi-user detector 40' and a channel decoder 50. The matched filter bank 30 and the channel decoder 50 are similar to those of FIG. 1. Therefore, a detailed description is omitted.

The multi-user detector 40' will now be described in detail.

Figure 4:
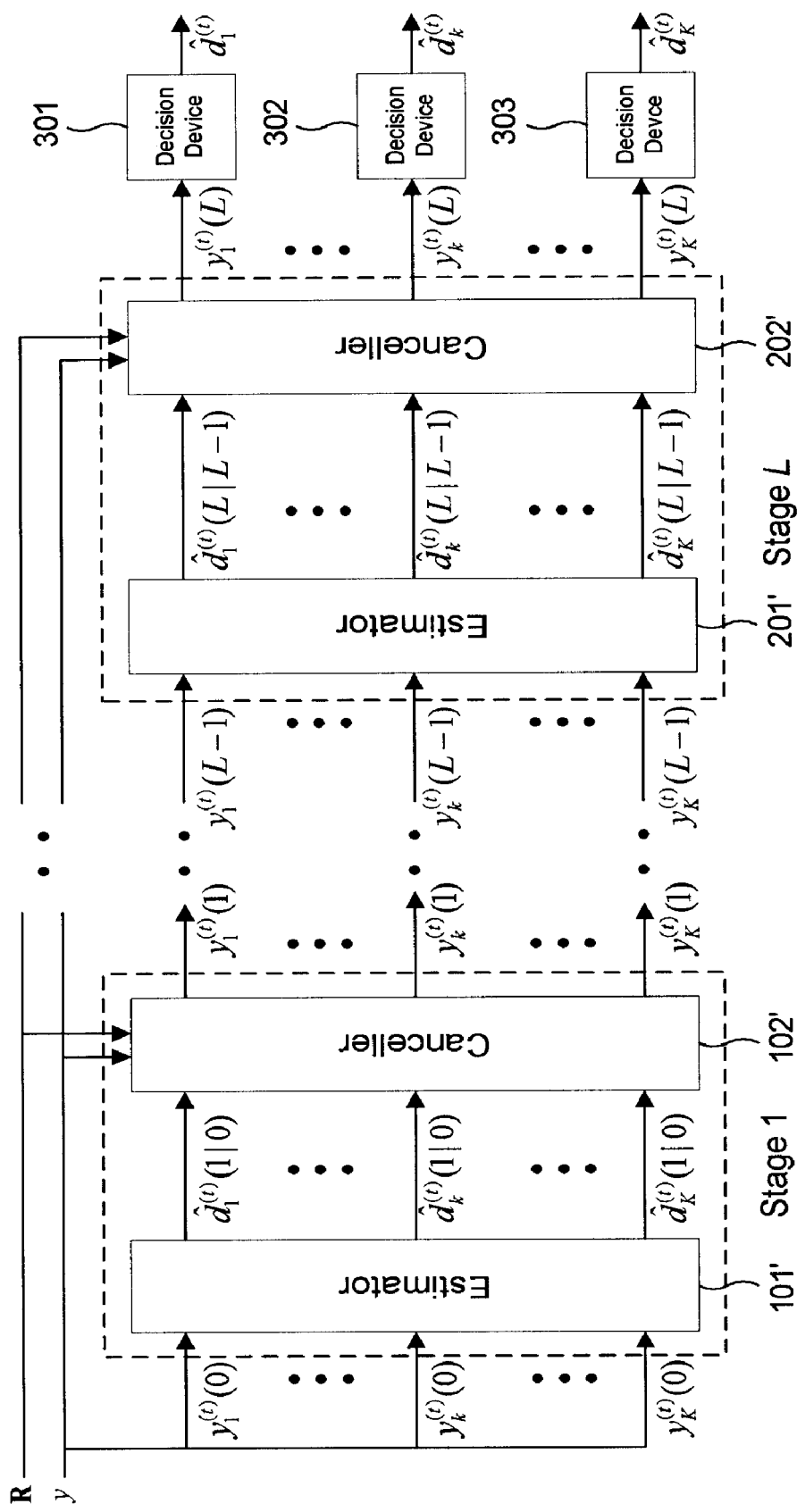
FIG. 4 is a block diagram illustrating a parallel interference canceller of a DS-CDMA system in accordance with the present invention.

FIG. 4 is a block diagram illustrating the parallel interference canceller of the DS-CDMA system in accordance with the present invention.

Referring to FIG. 4, the multi-user detector 40' comprises estimators 101' and 201' and cancellers 102' and 202'. While only the estimators 101' and 201' and the cancellers 102' and 202' are shown, the multi-user detector 40' comprises stage 1 through stage L, wherein each of the stages includes the estimator and the canceller.

The estimators 101' and 201' of the JDD receiver in accordance with the present invention employs Viterbi algorithm which is a MAP (maximum a posteriori) decoding to minimize a probability of a codeword error for a convolution code. The JDD receiver in accordance with the present invention minimizes the probability of an error of a partial codeword consisting of one or more channel symbols.

In a trellis diagram of the Viterbi algorithm, a path comprises a state and a branch. Each entire codeword $d_k=[d_k^{(1)}, \ldots, d_k^{(N+l)}]=[d_k^{(1)}, \ldots, d_k^{(n(N+l))}]$ may be represented by a unique state sequence $S_k=[S_k^{(0)}, \ldots, S_k^{(t)}, \ldots, S_k^{(N+l+1)}]$, where $S_k^{(0)}=0$ and vice versa. A partial codeword $d_k^{(t)}=[d_k^{((n-1)(t+l))}, \ldots, d_k^{(nt)}]$ corresponds to a state transition (branch) from a state $S_k^{(t-1)}$ at a time t−1 to a state $S_k^{(t)}$ at a time t, where t=1, . . . , N+l. Therefore, the entire codeword $d_k$ of the channel symbols corresponds to the path of the convolution code and the partial codeword $d_k^{(t)}$ of the channel symbols corresponds to the branch of the convolution code of the convolution code.

The partial codeword $d_k^{(t)}$ also contains a partial decoding information about the transmitted symbols. The JDD receiver uses the partial codeword $d_k^{(t)}$ corresponding to the state transition (branch) in each of estimation steps, and constantly tracks the state sequence $S_k$. Through these methods, a complexity of the receiver is reduced at a small expense of sub-optimum decoding at the estimation steps.

On the other hand, while a length of the partial codeword may selected from one extreme of using a single transition sequence (minimum partial codeword) to the other extreme utilizing the entire codeword, it is preferable that the minimum partial codeword, i.e. the single transition sequence is selected since the complexity increases as the length of the partial codeword is increased despite an increase in a performance improvement.

The JDD receiver employs a posteriori signal $y_k^{(t)}$ corresponding to the partial codeword $d_k^{(t)}$ of the channel symbols. An estimate $\hat{d}_k^{(t)}$ of the partial codeword is obtained using the posteriori signal $y_k^{(t)}$ and a probability of an initial state $S_k^{(t-1)}$, and calculates a probability of final states $S_k^{(t)}$ for a next posteriori signal $y_k^{(t+1)}$. A probability functions are defined as equations 2 and 3.

$$\alpha_t(s_t)=Pr\{S_k^{(t)}=s_t; y_k^{(1)}; \ldots; y_k^{(t)}\} \quad \text{[Equation 2]}$$

$$\gamma_t(s_{t-1},s_t)=Pr\{S_k^{(t)}=s_t; y_k^{(t)}|S_k^{(t-1)}=s_{t-1}\} \quad \text{[Equation 3]}$$

where $s_t$ and $s_{t-1}$ are the states at the time t and the time t−1, respectively.

According to the Markov property of the convolution code, the probability function of equation 2 may be expressed as equation 4.

$$\begin{aligned}\alpha_t(s_t) &= \sum_{s_{t-1}} Pr\{S_k^{(t-1)} = s_{t-1}; S_k^{(t)} = s_t; y_k^{(1)}, \ldots, y_k^{(t)}\} \\ &= \sum_{s_{t-1}} Pr\{S_k^{(t-1)} = s_{t-1}; y_k^{(1)}, \ldots, y_k^{(t-1)}\} Pr\{S_k^{(t)} \\ &= s_t; y_k^{(t)}|S_k^{(t-1)} = s_{t-1}\} \\ &= \sum_{s_{t-1}} \alpha_{t-1}(s_{t-1})\gamma_t(s_{t-1}, s_t)\end{aligned} \quad \text{[Equation 4]}$$

Boundary conditions are as shown in equation 5.

$$\alpha_0(0)=1, \text{ and } \alpha_0(i)=0 \text{ for } i \neq 0. \quad \text{[Equation 5]}$$

Therefore, the probability function $\alpha_t(s_t)$ can be obtained from the probability function $\alpha_{t-1}(s_{t-1})$ and the probability function $\gamma_t(s_{t-1},s_t)$ recursively. The probability function $\gamma_t(s_{t-1},s_t)$ of equation 3 may be expressed as equation $$\gamma_t(s_{t-1}, s_t) = Pr\{S_k^{(t)} = s_t; y_k^{(t)} | S_k^{(t-1)} = s_{t-1}\} \quad \text{[Equation 6]}$$

$$= \frac{Pr\{S_k^{(t)} = s_t, S_k^{(t-1)} = s_{t-1}, y_k^{(t)}\}}{Pr\{S_k^{(t-1)} = s_{t-1}\}}$$

$$= Pr\{y_k^{(t)} | S_k^{(t)} = s_t, S_k^{(t-1)} = s_{t-1}\} \cdot Pr\{S_k^{(t)} = s_t | S_k^{(t-1)} = s_{t-1}\}$$

$$= Pr\{y_k^{(t)} | d_k^{(t)}\} \cdot Pr\{S_k^{(t)} = s_t | S_k^{(t-1)} = s_{t-1}\}$$

$Pr\{S_k^{(t)}=s_t|S_k^{(t-1)}=s_{t-1}\}$ is a state transition probability function defined as value of 1 when there is a trellis transition between the state $s_{t-1}$ and $s_t$, and as value of 0 otherwise. Therefore, the probability function $\gamma_t(s_{t-1},s_t)$ is equivalent to q branch metric in the Viterbi algorithm.

On the other hand, from equation 4, the MAP decoding on the state transition (branch) becomes a procedure for maximizing a probability of a next state based on $\alpha_{t-1}(s_{t-1})$ and $\gamma_t(s_{t-1},s_t)$ as expressed in equation 7 below.

$$\hat{S}_k^{(t)} = \arg\max_{s_t \in S}[\log Pr(S_k^{(t)} = s_t | y_k^{(1)}; \ldots; y_k^{(t)})] \quad \text{[Equation 7]}$$

$$= \arg\max_{s_t \in S}[\log\{Pr(\alpha_t(s_t)) - Pr(y_k^{(1)}; \ldots; y_k^{(t)})\}],$$

$$\text{for } t = 1, \ldots, N+1,$$

$$= \arg\max_{s_t \in S}[\log Pr(\alpha_t(s_t))]$$

s is a set of the states, and $s_t$ is the state at the time t and $s_{t+1}$ is the state at the time t+1.

Finally, the estimate of the partial codeword $\hat{d}_k^{(t)}$ for t=1, . . . , N+1 may be expressed as equation 8.

$$\hat{d}_k^{(t)} = \arg\max_{s_t, s_{t-1} \in S}[\log Pr(S_k^{(t-1)} = s_{t-1}; S_k^{(t)} \quad \text{[Equation 8]}$$

$$= s_t | y_k^{(1)}; \ldots; y_k^{(t)})]$$

$$= \arg\max_{s_t, s_{t-1} \in S}[\log\{Pr(\alpha_{t-1}(s_{t-1})\gamma(s_{t-1}, s_t)) - Pr(y_k^{(1)}; \ldots; y_k^{(t)})\}]$$

$$= \arg\max_{s_t, s_{t-1} \in S}[\log Pr(\alpha_{t-1}(s_{t-1})\gamma(s_{t-1}, s_t))]$$

Once the estimate of the partial codeword $\hat{d}_k^{(t)}$ are obtained in the estimators 101 and 201 in each of the stages, the cancellers 102 and 202 of a corresponding stage calculates the MAI for each of the users using the estimate of the partial codeword $\hat{d}_k^{(t)}$ of each of the users and a correlation matrix R to subtract the MAI calculated at an output $y_k^{(t)}$ of the matched filter for each of the users. A new output signal is used as an input of a prediction step in the next stage.

FIGS. 5 through 12 are graphs illustrating the performance and the complexity of the JDD receiver of the present invention, the conventional JDD receiver and a SDD (Separate Detection-Decoding) receiver.

Figure 5:
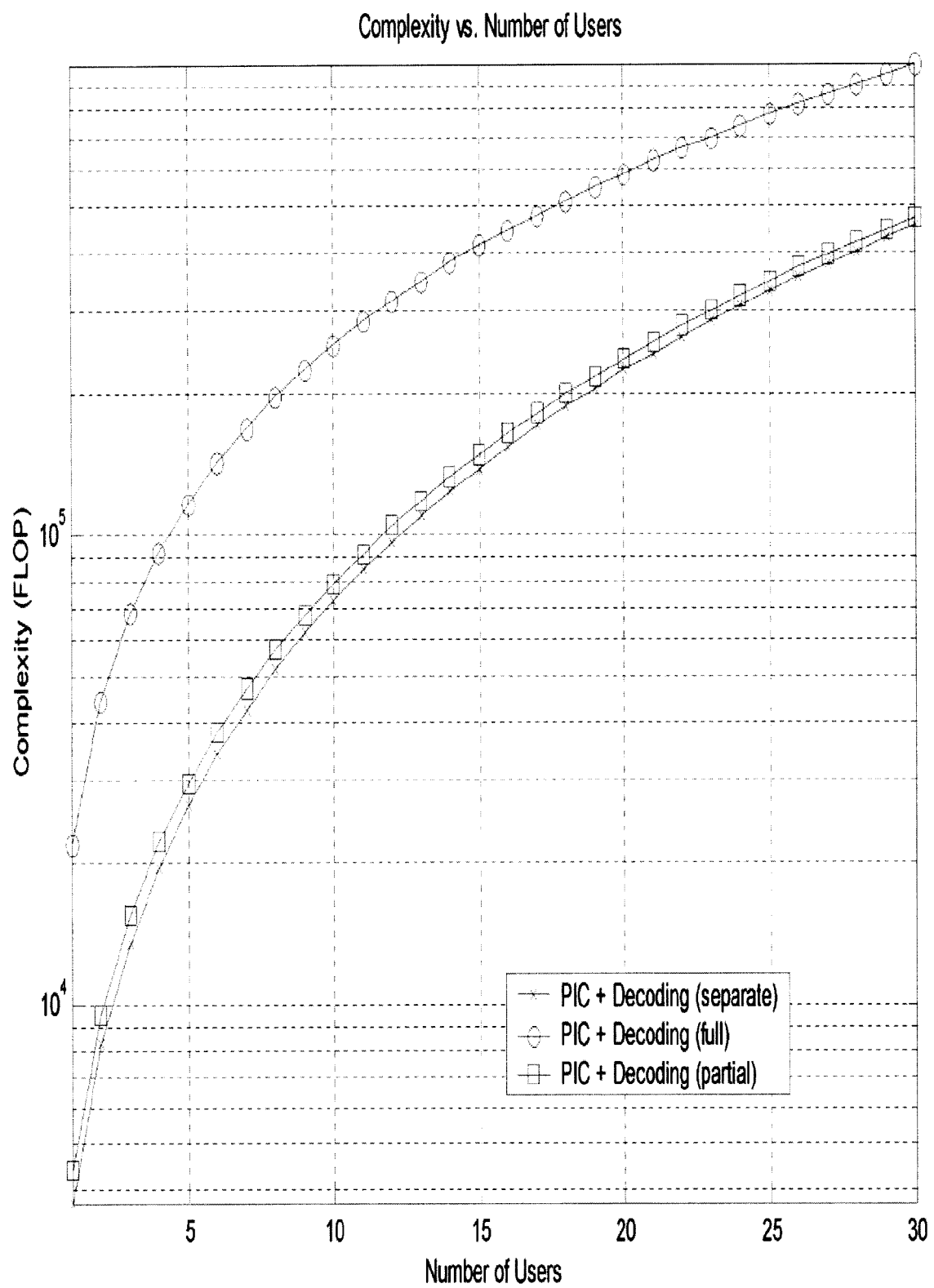
FIG. 5 is a graph illustrating a complexity according to a number of users of a JDD receiver in accordance with the present invention.
Figure 6:
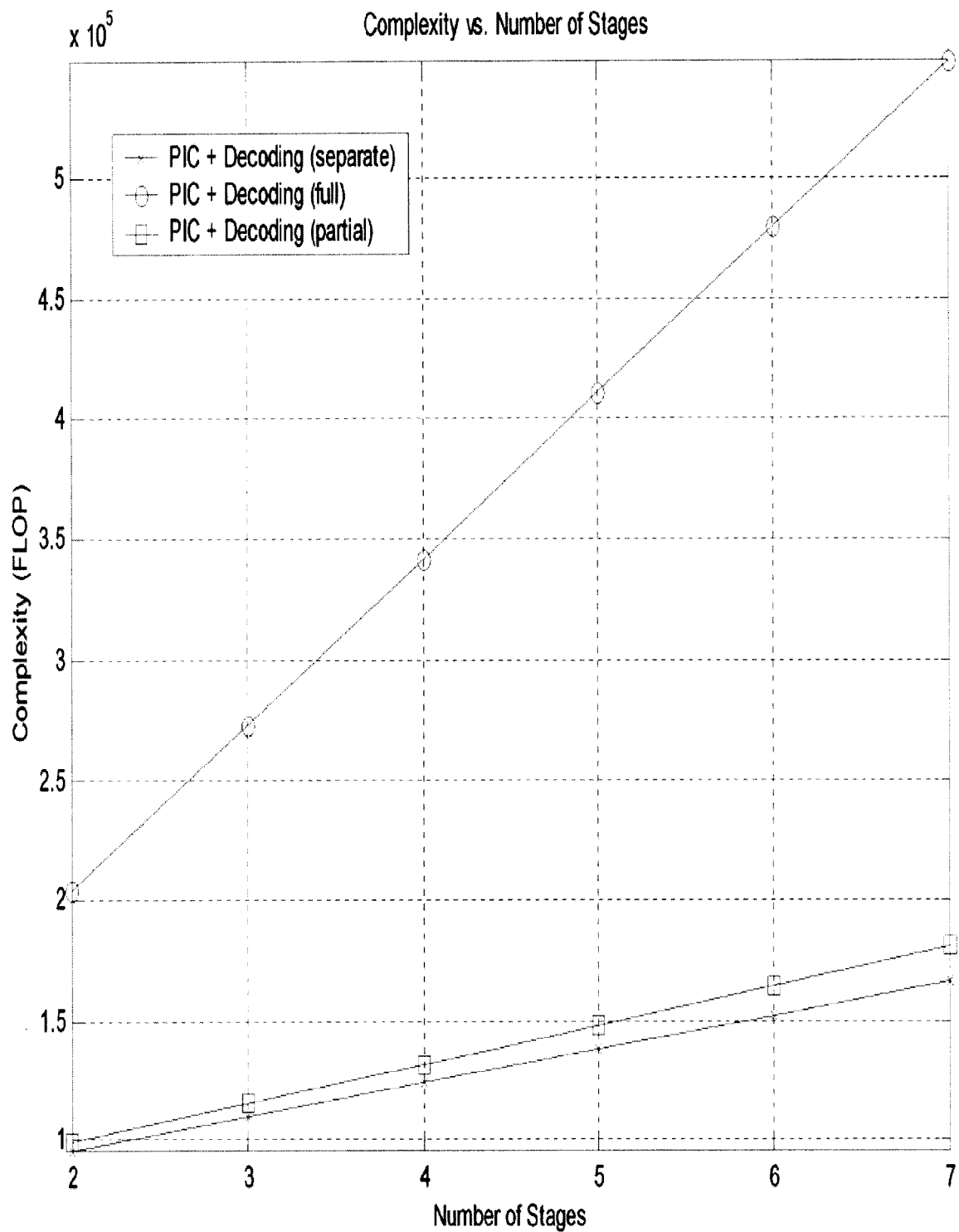
FIG. 6 is a graph illustrating a complexity according to a number of stages of a multi-stage parallel interference canceller of a JDD receiver in accordance with the present invention.

FIGS. 5 and 6 are graphs illustrating the complexity of the receivers using FLOP (FLoating Point Operations) according to an increase in a number of users and stages in accordance with the present invention. As shown, the conventional JDD employing the entire codeword is more complex than the SDD receiver. In particular, as shown in FIG. 6, the JDD receiver employing the partial codeword corresponding to the state transition information in accordance with the present invention may be embodied to have a low complexity similar to the SDD receiver despite the increases in the number of users and the PIC stages contrary to the conventional JDD receiver having the complexity that increases drastically according to the increase in the number of the users.

Figure 7:
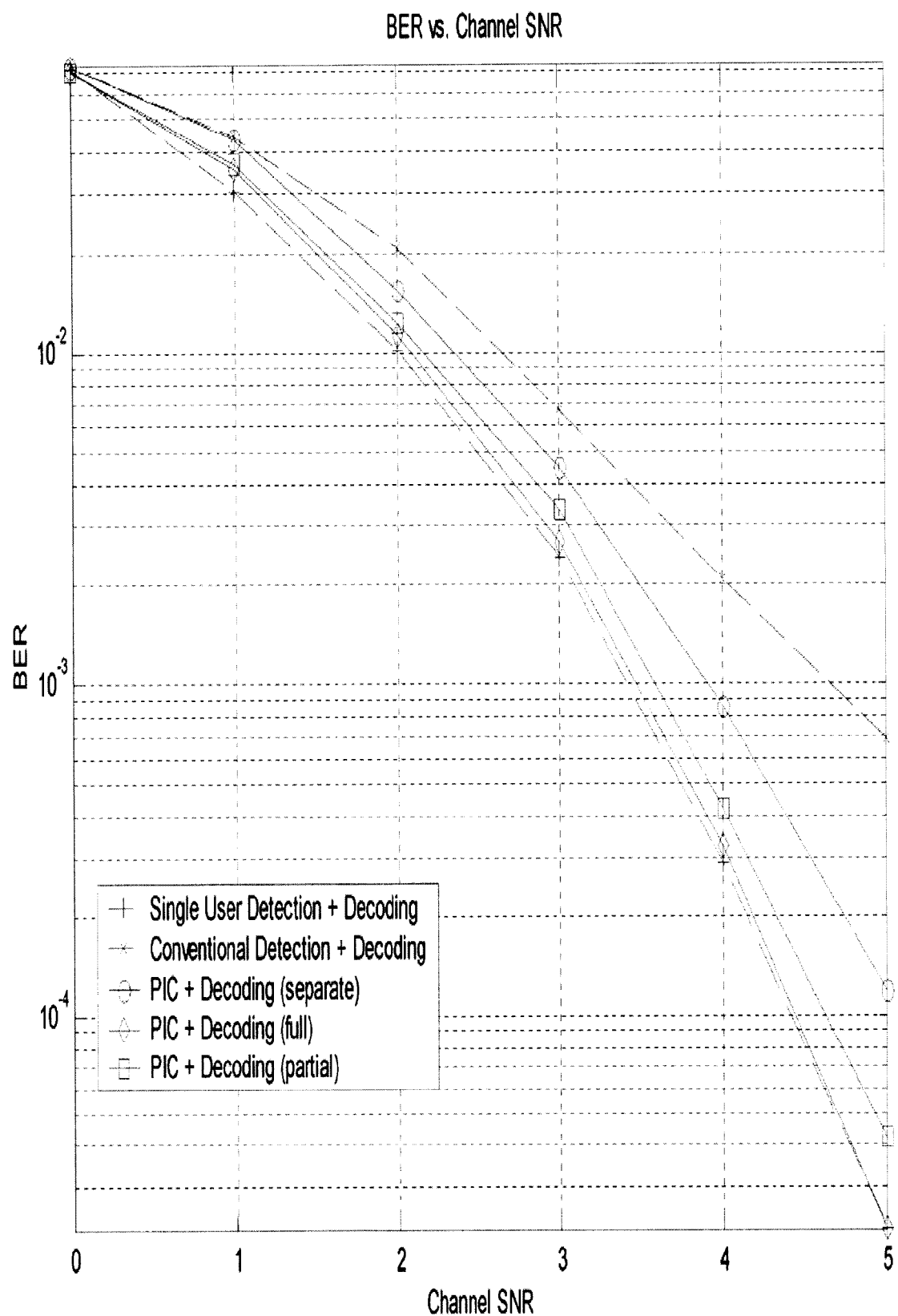
FIGS. 7 thorough 9 are graphs illustrating a performance according a variation of a channel SNR of a JDD receiver under various communication environments in accordance with the present invention.
Figure 8:
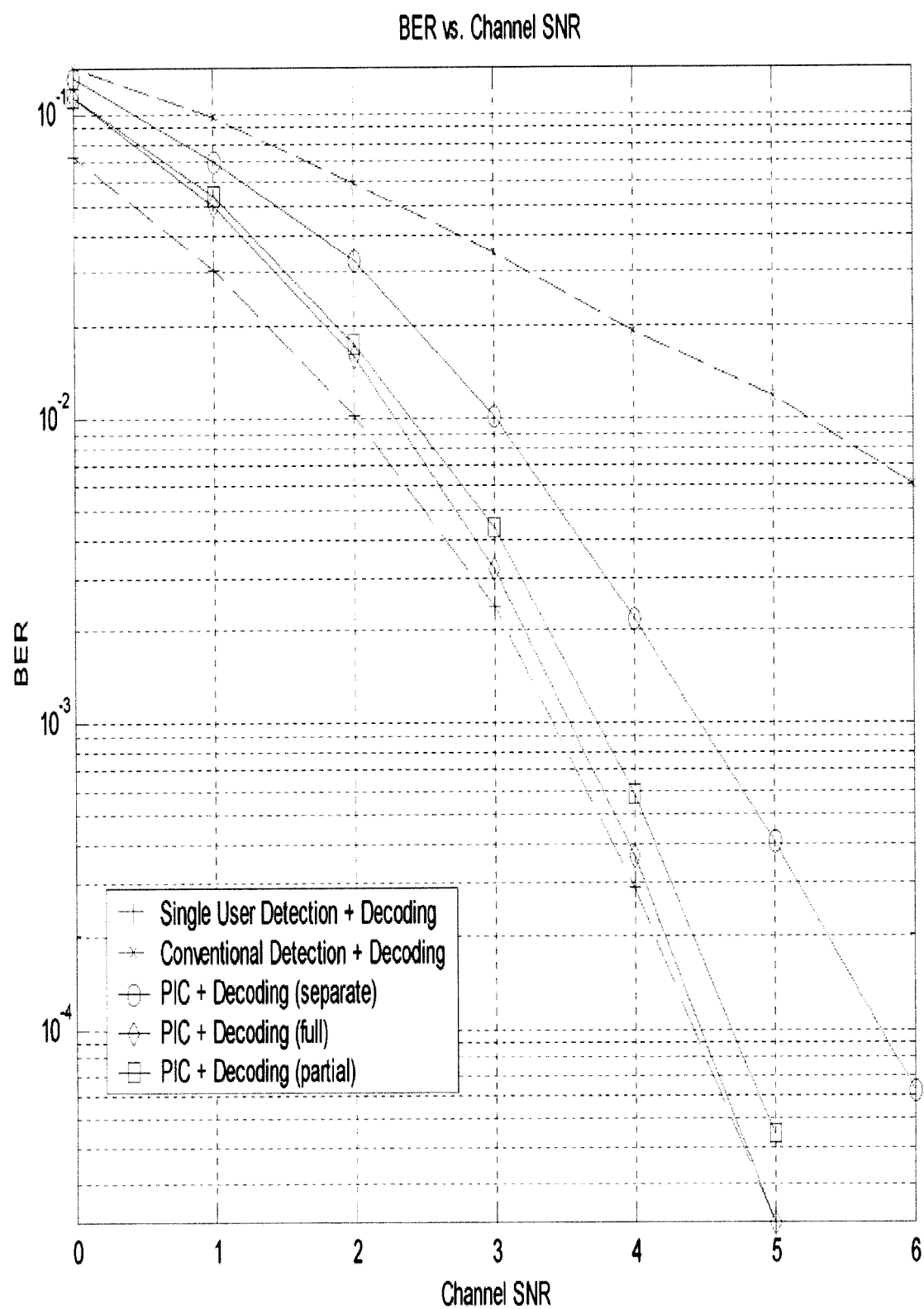
Figure 9:
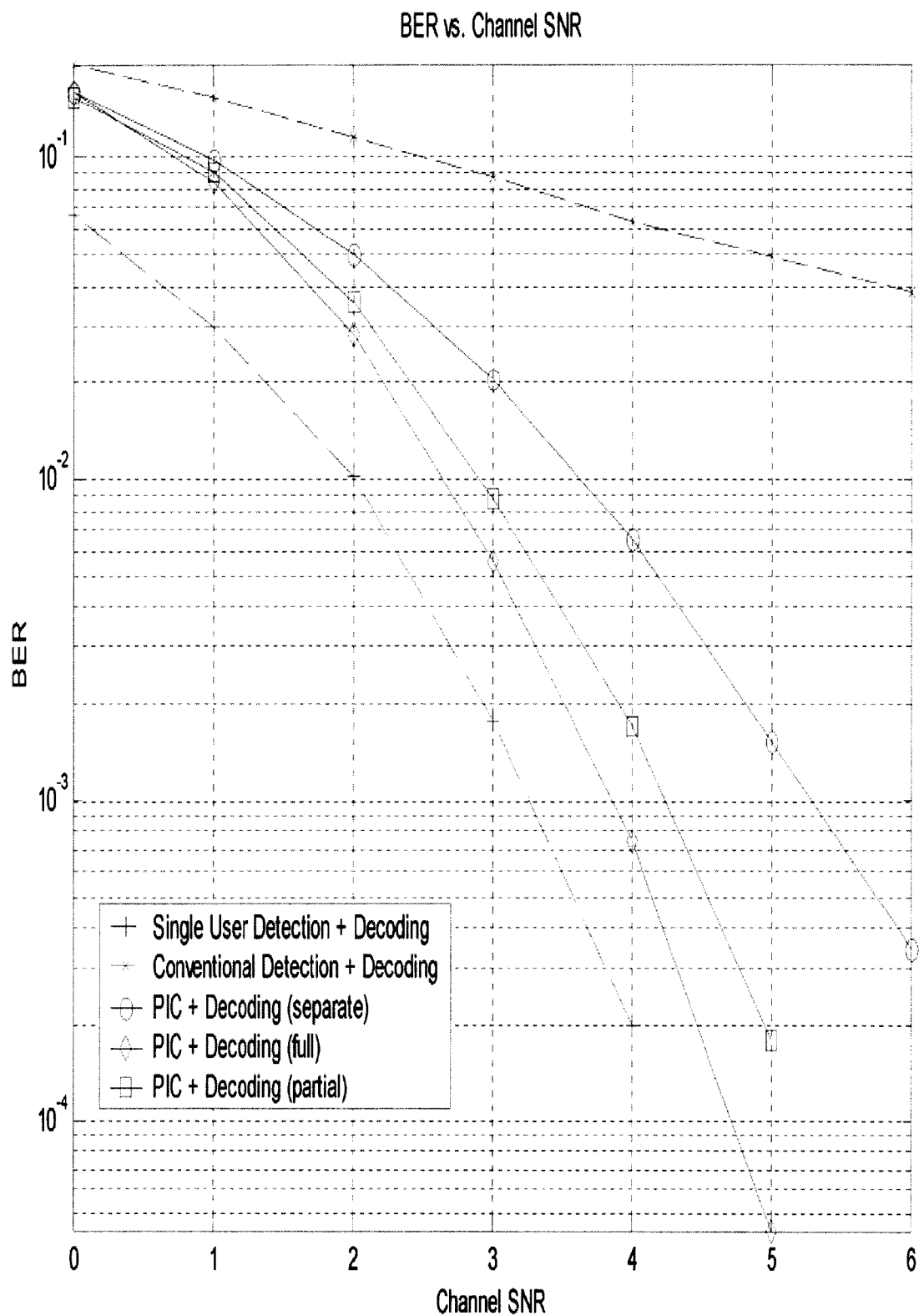

FIGS. 7 thorough 9 are graphs illustrating a performance using a BER (Bit Error Rate) according an increase in a channel SNR of the receivers in an environment of fifteen users, wherein a cross-correlation (rho) is 0.1, 0.15 and 0.2. As shown, the JDD receiver in accordance with the present invention has a performance similar to the conventional JDD receiver while the JDD receiver in accordance with the present invention has remarkably improved performance compared to the SDD receiver.

Figure 10:
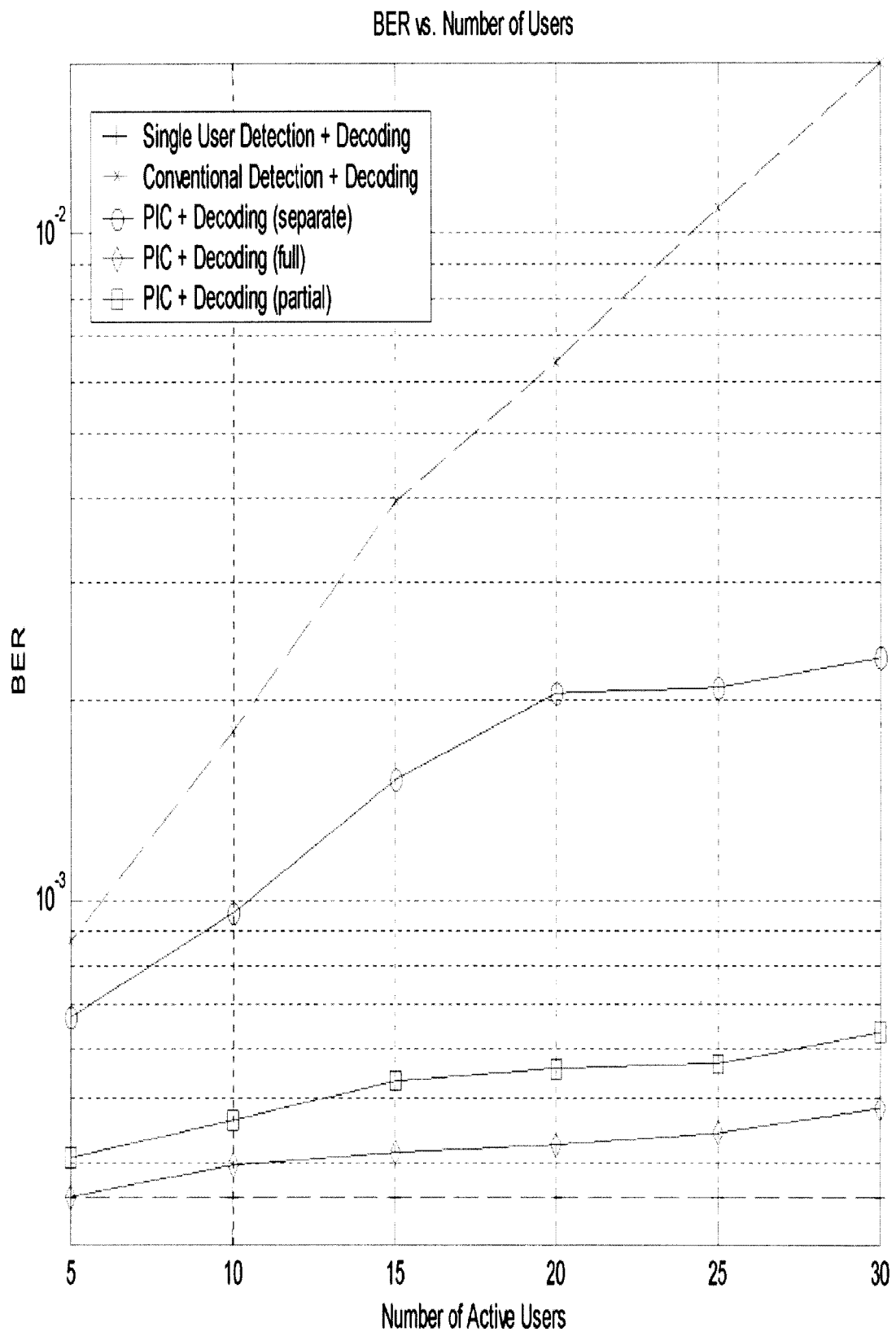
FIGS. 10 thorough 12 are graphs illustrating a performance according a number of users of a JDD receiver under various communication environments in accordance with the present invention.
Figure 11:
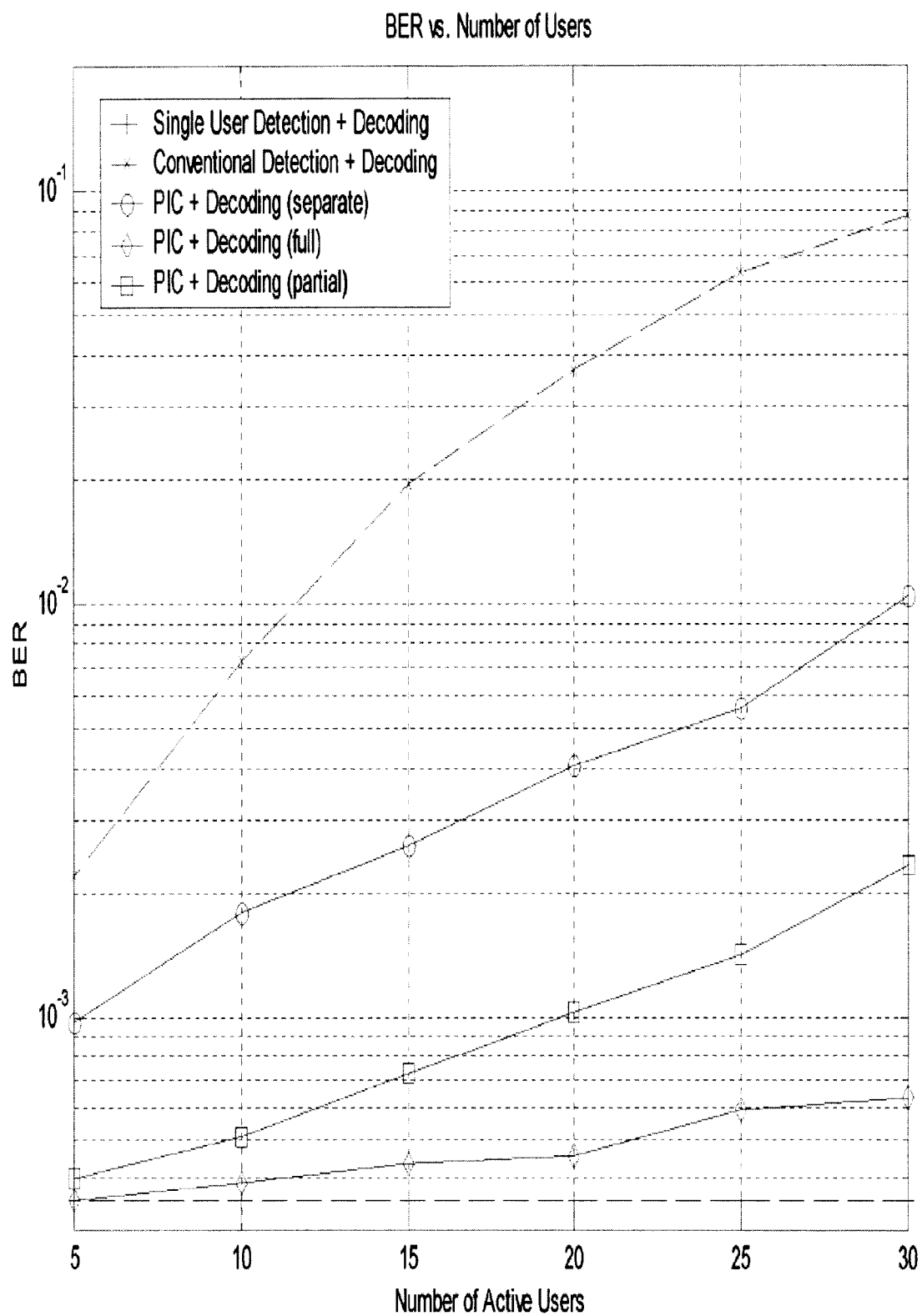
Figure 12:
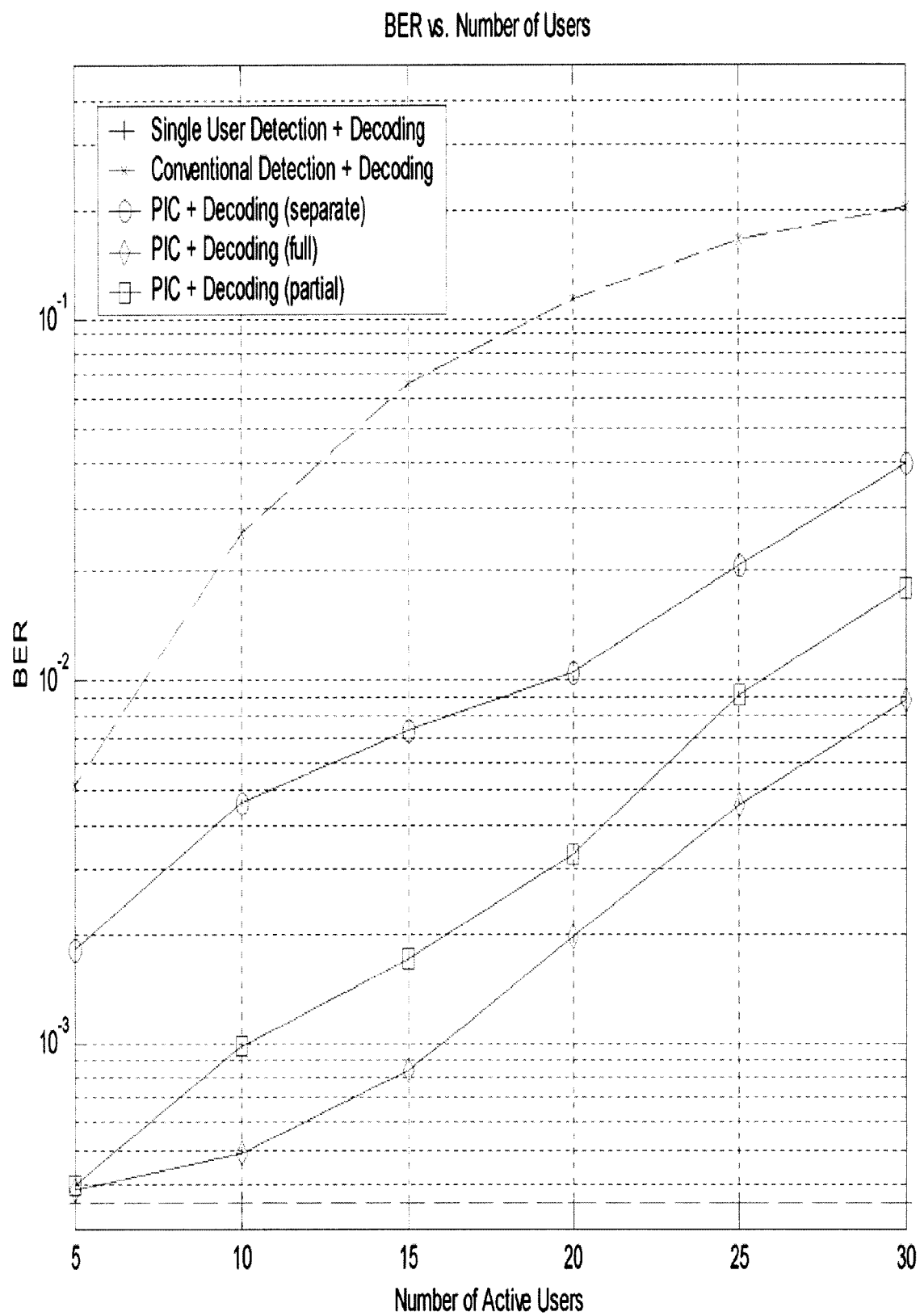

FIGS. 10 thorough 12 are graphs illustrating a performance according a number of users of the receivers in an environment of 4 dB SNR, wherein the cross-correlation (rho) is 0.1, 0.15 and 0.2. As shown, the JDD receiver in accordance with the present invention has a performance similar to the conventional JDD receiver while the JDD receiver in accordance with the present invention has remarkably improved performance compared to the SDD receiver.

As described above, in accordance with the JDD receiver of the DS-CDMA system of the present invention, the PIC employs the state sequence to selectively carry out the symbol estimation of the partial codeword corresponding to the branch so as to effectively reduce complexity and a calculation load compared to the conventional JDD receiver wherein the symbol estimation is carried out for the entire codeword as well as maintaining a high performance of the receiver according to the joint detection-decoding.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A joint detection-decoding receiver of a DS-CDMA system, the receiver comprising:
   a matched filter for dividing a plurality of channel coded symbols of a plurality of users according to each of the plurality of users to generate a matched filter output; and
   a multistage parallel interference canceller for repeatedly carrying out a symbol estimation for each of the plurality of users using the matched filter output and a symbol removal of other users using a correlation matrix to reduce a multiple access interference,
   wherein the multistage parallel interference canceller estimates a partial code word corresponding to a branch as a symbol estimation using a state sequence, and
   wherein the multistage parallel interference canceller estimates the partial code using an equation $$\hat{d}_k^{(t)} = \arg\max_{s_t, s_{t-1} \in S}[\log Pr(\alpha_{t-1}(s_{t-1})\gamma(s_{t-1}, s_t))],$$

wherein $\alpha_t(s_t)$ is defined as $$\alpha_t(s_t) = \sum_{s_{t-1}} \alpha_{t-1}(s_{t-1})\gamma_t(s_{t-1}, s_t),$$

$\alpha_0(0)=1$, and $\alpha_0(i)=0$ for $i \neq 0$, and $\gamma_t(s_{t-1}, s_t)$ is defined as $\gamma_t(s_{t-1}, s_t)=\Pr\{y_k^{(t)}|d_k^{(t)}\} \cdot \Pr\{S_k^{(t)}=s_t|S_k^{(t-1)}=s_{t-1}\}$, where $S_t$ is a state at a time t, and $S_{t-1}$ is a state at a time t-1.

2. The receiver in accordance with claim 1, wherein the plurality of symbols are encoded using a convolution code, and wherein the receiver decodes the plurality of the symbols using a MAP decoding.

3. The receiver in accordance with claim 2, wherein an information sequence $b_k=[b_k^{(1)}, \ldots, b_k^{(N)}]=[b_k^{(1)}, \ldots, b_k^{(mN)}]$ having a length of mN of a k-th user is encoded into a code word $d_k=[d_k^{(1)}, \ldots, d_k^{(N+1)}]=[d_k^{(1)}, \ldots, d_k^{(n(N+1))}]$ having a length of n(N+1) using a convolution code (n, m, l) having a code rate of m/n and a memory length of l, where N is a frame size of a channel code.

4. The receiver in accordance with claim 2, wherein the multistage parallel interference canceller selectively estimates the partial code word of a section corresponding to a single state transition.

5. The receiver in accordance with claim 1, wherein the multistage parallel interference canceller selectively estimates the partial code word of a section corresponding to a single state transition.

* * * * *